US012770653B1

(12) United States Patent
Bareza et al.

(10) Patent No.: US 12,770,653 B1
(45) Date of Patent: Oct. 20, 2026

(54) HETEROGENEOUS INTEGRATION OF NEAR FIELD TRANSDUCER COMPONENTS FOR HEAT-ASSISTED MAGNETIC RECORDING HEADS

(71) Applicant: Seagate Technology LLC, Fremont, CA (US)

(72) Inventors: Nestor Jr Dela Cruz Bareza, Londonderry (GB); Deepak Kumar Singh, Londonderry (GB); Amy Michelle Mackey, Claudy (IE); Brónagh Mitchell, Donegal (IE); Jeffery James Walter, Lino Lakes, MN (US); Lien Lee, Minnetonka, MN (US)

(73) Assignee: Seagate Technology, Fremont, CA (US)

( * ) Notice: Subject to any disclaimer, the term of this patent is extended or adjusted under 35 U.S.C. 154(b) by 0 days.

(21) Appl. No.: 19/372,615

(22) Filed: Oct. 29, 2025

(51) Int. Cl.
*G11B 5/60* (2006.01)
*G11B 5/31* (2006.01)
*G11B 5/00* (2006.01)

(52) U.S. Cl.
CPC .......... *G11B 5/6082* (2013.01); *G11B 5/3103* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 9,822,444 | B2 * | 11/2017 | Zhao | G11B 5/314 |
| 11,423,928 | B1 | 8/2022 | Kautzky et al. | |
| 11,710,502 | B1 * | 7/2023 | Lee | G11B 13/08 369/13.33 |
| 11,710,504 | B1 * | 7/2023 | Lee | G11B 5/3133 360/59 |
| 11,710,506 | B1 * | 7/2023 | Peng | G11B 5/6088 369/13.33 |
| 11,790,944 | B2 * | 10/2023 | Cheng | G11B 5/6088 369/13.33 |
| 11,798,582 | B2 * | 10/2023 | Puri | C22C 19/03 |
| 11,900,963 | B2 * | 2/2024 | Cheng | G11B 5/4866 |
| 12,198,721 | B2 * | 1/2025 | Cheng | G11B 13/08 |
| 12,249,356 | B1 * | 3/2025 | Lee | G11B 5/314 |

* cited by examiner

*Primary Examiner* — Fred Tzeng
(74) *Attorney, Agent, or Firm* — Mueting Raasch Group

(57) ABSTRACT

Described are methods heterogeneous integration of epitaxial (crystalline) material onto a near field transducer (NFT) of a heat-assisted magnetic recording (HAMR) head in a way that promotes robustness and improved performance of the NFT. While constructing NFTs with plasmonic disks terminating in single crystal (epitaxial) pegs may be desirable, such pegs cannot be directly formed on the NFT, and heterogeneous integration can result in interfacial voids that interrupt thermal contact and lower structural robustness. As such, after heterogeneous integration of a highly crystalline peg, a portion of the peg is removed and backfilled to improve the interface while leaving a single crystal portion of the peg intact.

16 Claims, 5 Drawing Sheets

HETEROGENEOUS INTEGRATION OF NEAR FIELD TRANSDUCER COMPONENTS FOR HEAT-ASSISTED MAGNETIC RECORDING HEADS

TECHNICAL FIELD

The disclosure relates to near field transducers for heat-assisted magnetic recording.

SUMMARY

In accordance with various aspects, the present disclosure describes methods of making near field transducers for use in heat-assisted magnetic recording heads, the near field transducers having a plasmonic disk and a peg extending from the plasmonic disk toward a media-facing surface of the heat-assisted recording head, and the plasmonic disk and peg being disposed on a sunken disk. Such methods include heterogeneously integrating the peg onto the near field transducer, thereby forming an interface between the peg and the sunken disk, removing a portion of the peg to reveal the interface, and backfilling the removed portion of the peg.

In certain aspects, the peg is formed on a transfer substrate prior to heterogeneously integrating the peg onto the near field transducer. For example, the peg may be formed by epitaxial growth to have a highly crystalline structure. In certain aspects, heterogeneously integrating the peg involves micro transfer printing the peg from a transfer substrate onto the sunken disk.

In certain aspects, backfilling the removed portion of the peg may be done using the same material that composes the peg, or using a different material. In certain aspects, backfilling the removed portion of the peg may result in a planar seam or a tapered seam.

In certain aspects, removing the portion of the peg and backfilling the removed portion of the peg produces an interface with the sunken disk having better thermal contact and structural robustness than prior to the removing and backfilling.

In accordance with various aspects, the present disclosure describes recording heads for use in heat-assisted magnetic recording, such recording heads including a write pole extending to a media-facing surface of the recording head, and a near field transducer located adjacent to the write pole, the near field transducer configured to generate plasmonic activity from light delivered by a waveguide and to focus and direct the plasmonic activity toward a recording surface of magnetic recording media placed adjacent to the media-facing surface. The near field transducer includes a plasmonic disk and a peg extending from the plasmonic disk toward the media-facing surface, the plasmonic disk and peg being disposed on a sunken disk such that the peg has a first portion that extends beyond the sunken disk and a second portion that forms an interface with the sunken disk, wherein the first portion of the peg is highly crystalline and the second portion of the peg is polycrystalline, and wherein the interface is substantially free of voids.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
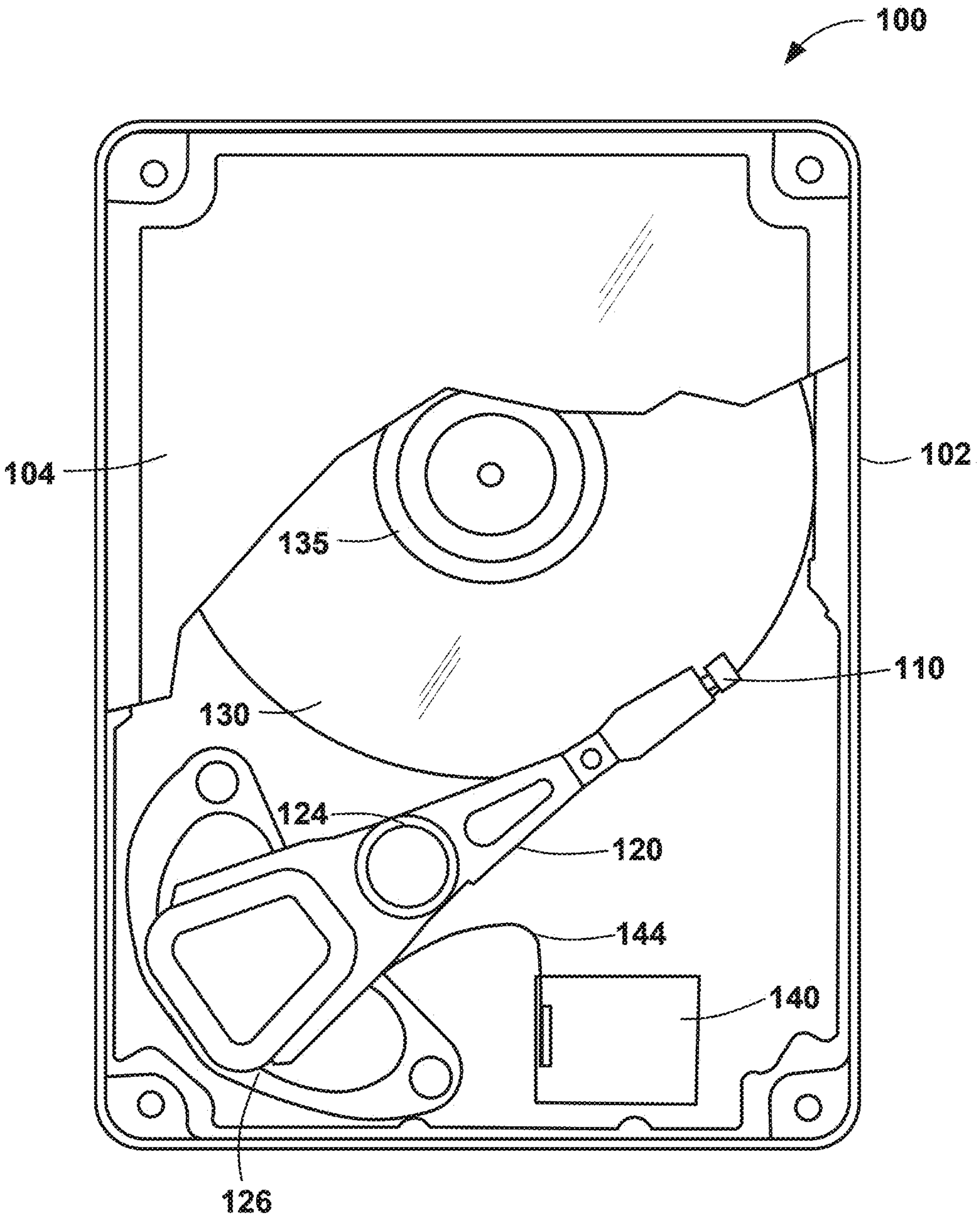
FIG. 1 is a schematic representation of a hard disk drive having a recording head that may incorporate a near field transducer in accordance with aspects of the present disclosure.

The present disclosure relates to heat-assisted magnetic recording (HAMR) and to HAMR recording heads for hard disk drives (HDDs) that incorporate HAMR writers utilizing a near field transducer (NFT) to generate plasmonic activity that can be directed onto the recording surface of magnetic media to assist in the recording of bits. In particular, the present disclosure relates to heterogeneous integration of epitaxial (crystalline) material onto an NFT in a way that promotes robustness and improved performance. For example, it may be desirable that the pegs that extend from NFT plasmonic disks be epitaxially formed. These pegs help focus and direct the plasmonic activity toward the magnetic recording media surface. It has been found that a higher degree of crystallinity within the material of the peg component can lead to greater robustness in the peg and in the NFT overall. However, the structure of the NFT and of the surrounding HAMR head may inhibit the direct, in-place, epitaxial deposition of single-crystal pegs due to the high processing temperatures required. As such, heterogeneous integration methods have been proposed that allow for the formation of highly crystalline peg components that can later be transferred onto the NFT (see, for example, the processes described in U.S. Pat. No. 11,423,928, which is wholly incorporated into this document by reference).

As recognized by the present disclosure, the heterogeneous integration of NFT pegs can lead to sub-optimal physical and thermal contact between the peg and other components of NFT, such as a sunken disk that may be disposed beneath the plasmonic disk of the NFT. Such sub-optimal physical and thermal contact may include interfacial voids formed during heterogeneous integration between the peg and the component onto which the peg is being integrated.

To address sub-optimal interfacial contact with a heterogeneously integrated peg in a HAMR NFT, the present disclosure provides for removing a portion of the peg after heterogeneous integration, for example by milling and/or etching, and then backfilling the removed portion of the peg. This process may be used to first expose the sub-optimal interface and then to refill the exposed area in such a manner as to produce a voidless interface between the peg and the underlying NFT component, while still retaining the epitaxial portion of the peg. This allows the portion of the peg that extends to the media-facing surface of the HAMR head to be single crystalline while providing for a robust physical and thermal interface between the peg and other components of the NFT.

As such, the present disclosure provides methods of heterogenous integration that allow for: utilizing single crystalline and high epitaxial peg materials for improved performance over the current directly-deposited polycrystalline pegs; micro transfer printing of the peg materials; and using a mill-back plus backfill process that retains the epitaxial material of the peg and improves the thermal contact and robust over the disk region by removing voids.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts an example HDD device 100 that includes a recording head 110 having read and write capabilities. Recording head 110 is disposed on the end of an actuator arm 120 that is rotationally movable around a pivot 124 by use of a voice coil motor 126. Other driving and actuation mechanisms may be used, including piezoelectric motors, linear rail actuators, and so forth. The recording head 110, which may include a write transducer (writer) and a read transducer (reader), is positioned in close proximity to the surface of magnetic media disk 130 such that the recording head can write data to and read data from tracks on the magnetic media 130 as it spins by action of a spindle motor 135. Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be communicatively coupled to spindle motor 135, and thereby control the spinning of the media disk(s) 130 along with the movement of the actuator 120 and the reading and writing of data via recording head 110.

The internal components of HDD 100 are contained within an enclosure 102, including cover 104 (which is shown partially cut away to reveal the internal components). The enclosure 102 may be sealed and filled with a desired atmosphere, such as a gas mixture including primarily helium gas, to create a controlled environment inside the HDD 100. A host device can communicate with HDD 100 through a standardized interface (not shown). HDD 100 can operate on any magnetic recording principle, whether that be conventional magnetic recording (CMR), shingled magnetic recording (SMR), HAMR, or any other type of recording technique, including combinations thereof. Recording head 110 may include a writer for heat-assisted magnetic recording that is configured to include a near field transducer that is formed in accordance with one or more aspects of the present disclosure.

Figure 2:
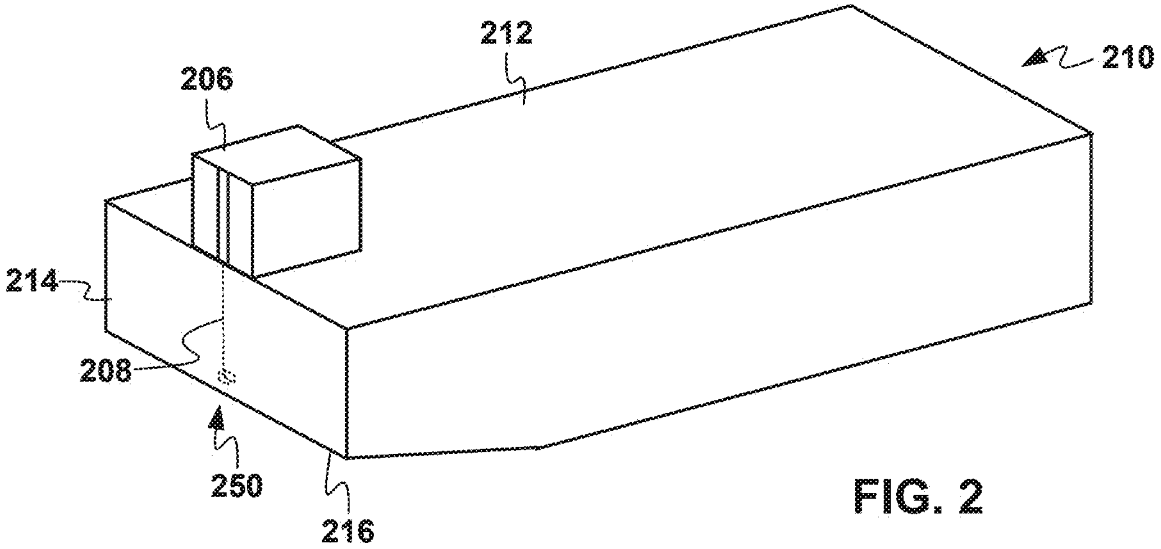
FIG. 2 is a schematic perspective view of a recording head that may incorporate a near field transducer in accordance with aspects of the present disclosure.

FIG. 2 shows a schematic view of a recording head 210 according to an example embodiment. The recording head 210 may be used in a magnetic data storage device such as a HAMR hard disk drive. The recording head 210 has a slider body 212 with read and write transducers 250 at a trailing edge 214 of recording head 210 that are located at or near a media-facing surface 216, which is positioned proximate to a surface of a magnetic recording medium (not shown), such as a spinning magnetic disk, during writing and reading of data. The recording head 210 is configured for a HAMR device and thus includes components that form a hot spot on the recording medium near the read and write transducers 250. These HAMR components include an energy source 206 such as a single mode laser diode, and a waveguide 208. The waveguide 208 delivers electromagnetic energy from the energy source 206 to a near field transducer (NFT) that is part of the read/write transducers 250. The NFT achieves surface plasmon resonance and directs the resulting energy out of a media-facing surface 216 to create a small hot spot in the recording medium.

Figure 3:
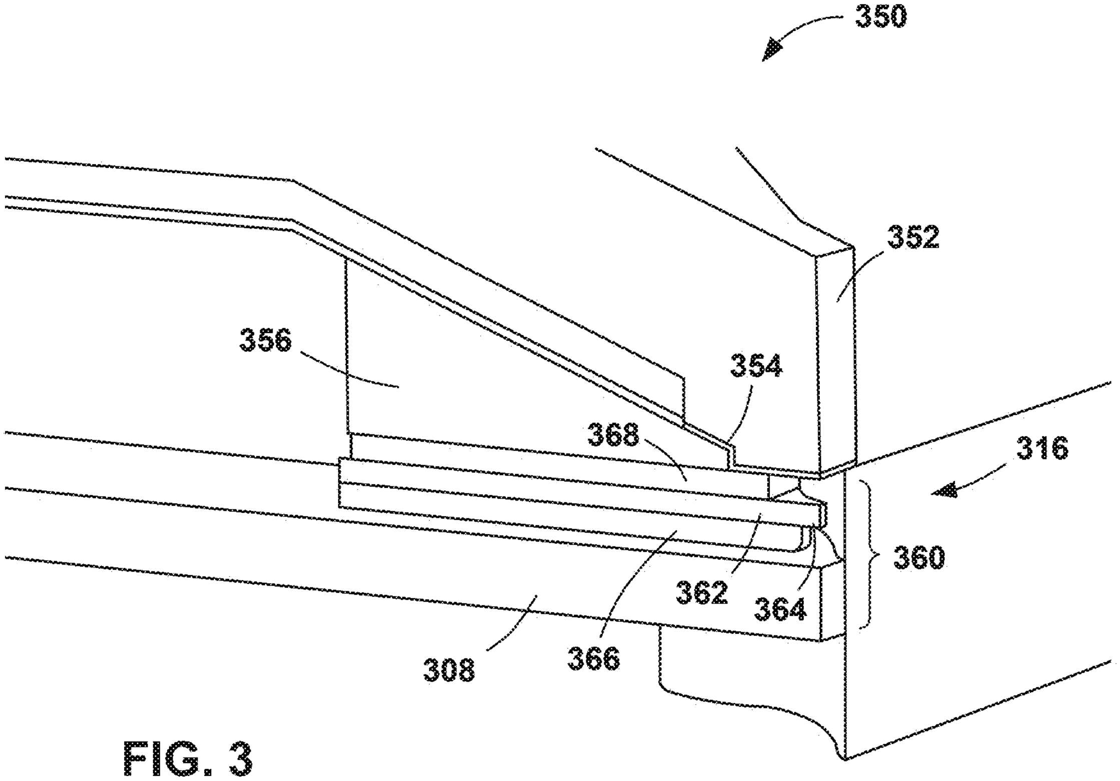
FIG. 3 is a schematic perspective view of a portion of a writer (write transducer) that may incorporate a near field transducer in accordance with aspects of the present disclosure.

FIG. 3 shows a schematic perspective view of a portion of a HAMR write transducer (writer) 350 that may be incorporated into a recording head. Writer 350 includes a write pole 352 and an NFT 360 that each extend to a media-facing surface 316 of the recording head. The media-facing surface 316 is placed in proximity to the recording surface of magnetic recording media (not shown) during reading and writing of data. NFT 360 includes a plasmonic disk 362 disposed between a middle disk 368 and a sunken disk 366. Plasmonic disk 362 may include a peg 364 that extends from the main body of plasmonic disk 362 toward the media-facing surface 316. A waveguide 308 delivers electromagnetic radiation, such as laser light from a laser diode (not shown), to the NFT 360. The electromagnetic radiation may be coupled into the sunken disk 366 from waveguide 308 for generation of plasmonic activity at the plasmonic disk 362. Peg 364 may focus and direct plasmons to the surface of the recording media (not shown) to assist in the recording process. A heat sink 356 may be disposed between the NFT 360 and the write pole 352, and a diffusion barrier 354 may be disposed between the heat sink 356 and the write pole 352. Peg 364 may be epitaxially grown, or otherwise formed of a single crystal material, and then heterogeneously integrated with NFT 360 in accordance with various aspects of the present disclosure.

Figure 4A:
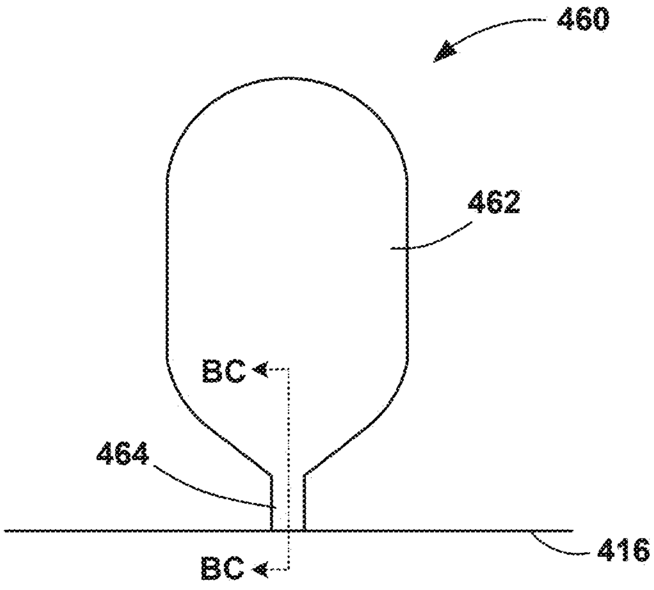
FIG. 4A is a schematic plan view of a portion of a near field transducer.
Figure 4B:
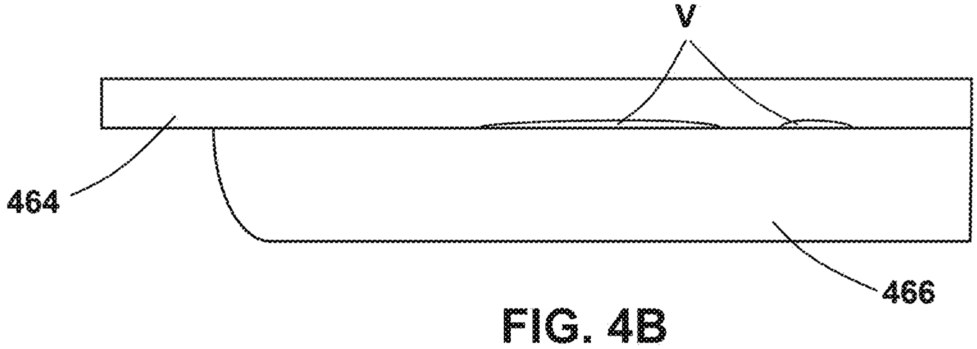
FIGS. 4B-C are schematic side views of the portion of the near field transducer shown in FIG. 4A taken along line BC.
Figure 4C:
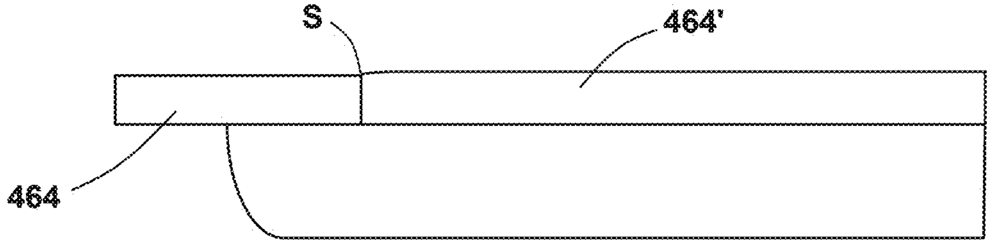

FIGS. 4A-C help illustrate certain aspects of heterogeneous integration. In FIG. 4A, a portion of an NFT 460 is shown, including a plasmonic disk 462 having a peg 464 that extends to a media-facing surface 416. The plasmonic disk 462 and peg 464 may be formed together as a single component, or may be separate components that are combined (for example, the peg may be a single crystal rod that is incorporated into a plasmonic disk). Without loss of generality, the peg and plasmonic disk will be discussed as if they were separate components. In accordance with certain aspects, peg 464 may be formed on a separate substrate (not shown) and then transferred onto the NFT 460 by micro transfer printing or any other suitable form of heterogeneous integration. This allows the peg 464 to be formed using processing conditions (such as epitaxial growth) that may not be possible or advisable directly on other components of the NFT (for example, due to the high temperatures required for epitaxial growth).

FIG. 4B shows a schematic side view of a portion of NFT 460 taken along line BC in FIG. 4A. As can be seen, the peg 464 has been integrated onto a sunken disk 466 so that a portion of the peg 464 extends past the sunken disk 466. Due to the nature of heterogeneous integration techniques such as transfer printing, voids V (or other similar defects) may form in the interface between the rigid crystalline material of the peg 464 and the upper surface of the sunken disk 466. These interfacial voids or other defects may have a deleterious effect on thermal contact and structural robustness in the NFT. The voids may be removed by removing a portion of the peg 464 and/or plasmonic disk to expose the interface, and then backfilling the removed portion(s). The result is illustrated in FIG. 4C, which shows a schematic side view of the same portion shown in FIG. 4B after removal of a portion of peg 464 and backfilling with peg material 464' (or optionally different material), thereby producing a seam S. In this manner, the portion of peg 464 that extends from the plasmonic disk 462 toward the media-facing surface 416 can remain intact as a highly crystalline/epitaxial component while improving thermal contact and structural robustness by removing the voids. Since the backfilling is done with conventional deposition techniques, it will generally produce a polycrystalline region between the single crystal/epitaxial peg and the plasmonic disk.

Figure 5A:
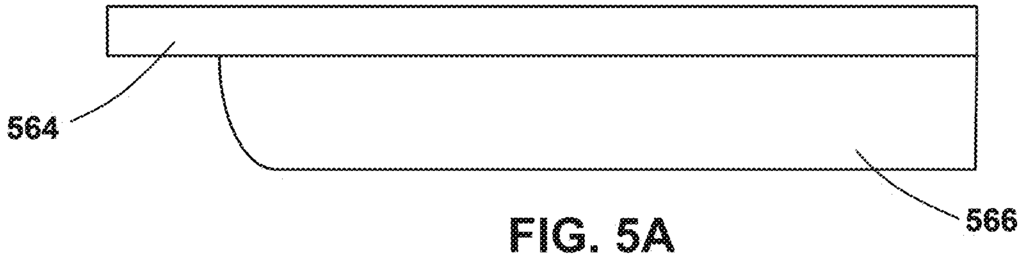
FIGS. 5A-C are schematic representations of steps in a process of forming a near field transducer having a heterogeneously integrated peg with a voidless interface in accordance with aspects of the present disclosure.
Figure 5B:
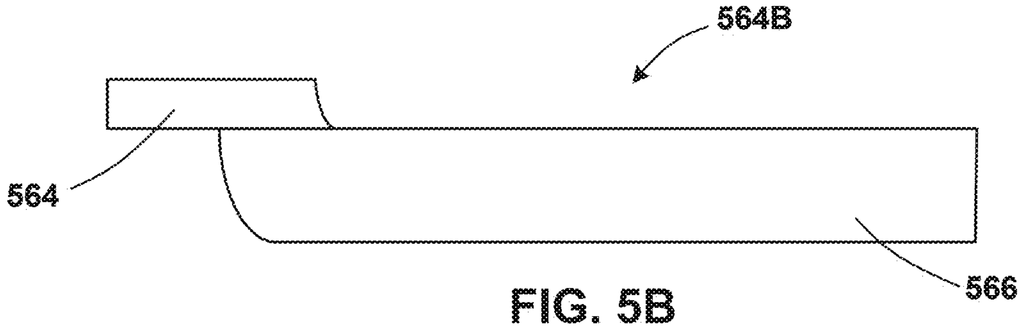
Figure 5C:
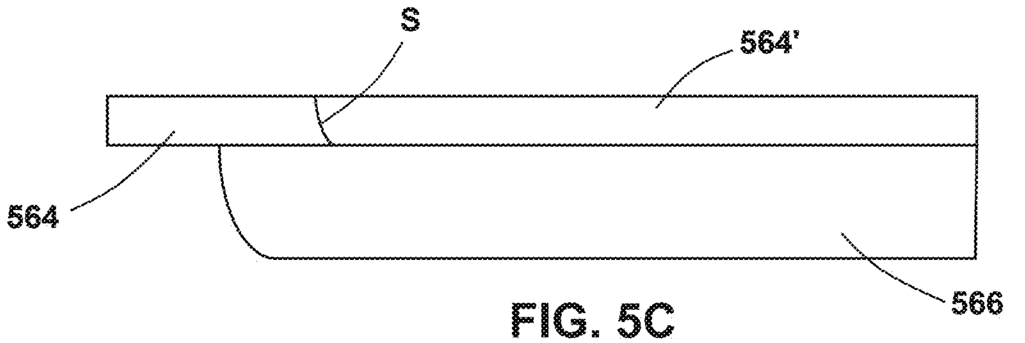

FIGS. 5A-5C further illustrate steps that may be performed in accordance with aspects of the present disclosure. In FIG. 5A, a peg 564 is heterogeneously integrated onto another component of an NFT, such as sunken disk 566. Methods of heterogeneous integration include any suitable technique for combining separate components into a single package such as micro transfer printing, die stacking, wafer bonding, flip-chip bonding, and other wafer-level techniques used in semiconductor packaging. Next, as illustrated in FIG. 5B, a portion of the peg 564 (optionally along with portions of the plasmonic disk) that resides on the sunken disk 566 is removed, indicated by removed portion 564B, thereby exposing what was the interface between the peg 564 and the sunken disk 566. In certain instances, the removal process may remove some of the underlying material of the sunken disk 566. Removal of the portion of the peg 564 may take place by any suitable removal method in which a desired portion of the peg 564 can be removed and desired portion can remain, such as ion milling, etching, and so forth. In FIG. 5C, the removed portion is backfilled to form a backfilled portion 564'. The backfilled portion 564' may be the same material as the peg 564 or may be a different material, and may be deposited in any suitable manner that does not result in the formation of interfacial voids or other similar defects such as are typically produced by heterogeneous integration methods. Backfilling the removed portion of peg 564 results in a seam S between the peg 564 and the backfilled portion 564'. The shape of seam S may depend on the removal and/or backfilling processes, and may be tailored to optimize performance based on the materials used.

Figure 6A:
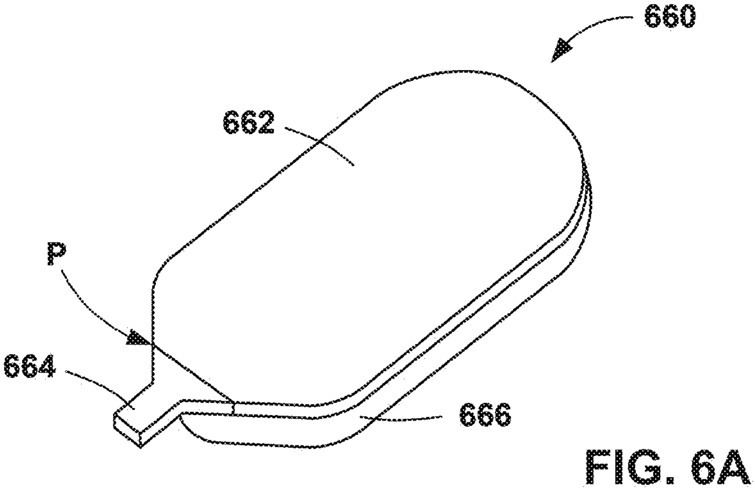
FIGS. 6A-B are schematic perspective views of near field transducers having heterogeneously integrated pegs in accordance with aspects of the present disclosure.
Figure 6B:
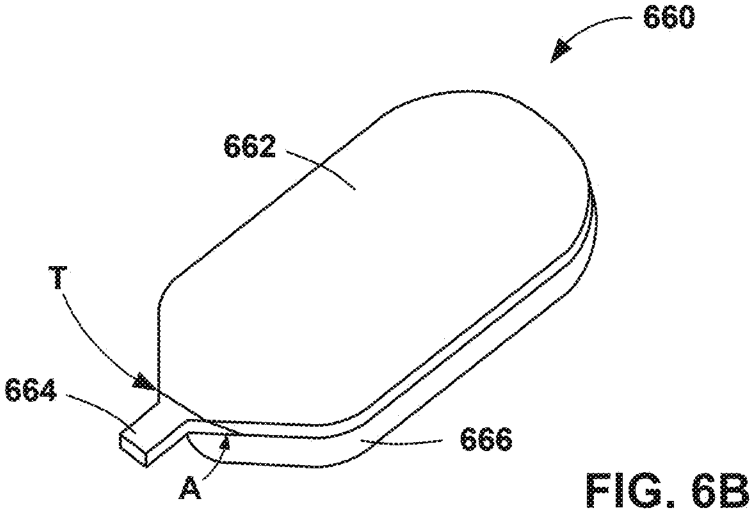

FIGS. 6A and 6B illustrate two of many possible seams that may be formed between a heterogeneously integrated peg 664 and the plasmonic disk 662 that includes a backfilled portion. In FIGS. 6A and 6B, an NFT 660 includes a sunken disk 666 onto which a plasmonic disk 662 and peg 664 are formed using methods in accordance with the present disclosure. In FIG. 6A, a removal process has been used that creates a planar seam P that is essentially perpendicular to the plane of the plasmonic disk 662. In FIG. 6B, a removal process has been used that creates a tapered seam T, which forms an angle A with the material of the plasmonic disk 662. The choice of seam shape may depend on the materials, removal method, and/or backfill method being employed. For example, a planar seam may be suitable for use with a backfill material that is the same as the peg material, and a tapered seam may be suitable for use with a backfill material that is different than the peg material in order to form a transition region between the materials.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques).

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for making a near field transducer for use in a heat-assisted magnetic recording head, the near field transducer having a plasmonic disk and a peg extending from the plasmonic disk toward a media-facing surface of the heat-assisted recording head, the plasmonic disk and the peg being disposed on a sunken disk, the method comprising:

heterogeneously integrating the peg onto the near field transducer, thereby forming an interface between the peg and the sunken disk;

removing a portion of the peg to reveal the interface; and backfilling the removed portion of the peg.

2. The method of claim 1, further comprising forming the peg on a transfer substrate prior to heterogeneously integrating the peg onto the near field transducer.

3. The method of claim 1, further comprising forming the peg by epitaxial growth prior to heterogeneously integrating the peg onto the near field transducer.

4. The method of claim 1, wherein the peg has a highly crystalline structure.

5. The method of claim 1, wherein heterogeneously integrating the peg comprises micro transfer printing the peg from a transfer substrate onto the sunken disk.

6. The method of claim 1, wherein heterogeneously integrating the peg introduces voids into the interface between the peg and the sunken disk, and removing the portion of the peg to reveal the interface exposes the voids.

7. The method of claim 1, wherein heterogeneously integrating the peg comprises micro transfer printing, die stacking, wafer bonding, or flip-chip bonding.

8. The method of claim 1, wherein the peg is composed of a peg material, and backfilling the removed portion of the peg comprises depositing material that is the same as the peg material.

9. The method of claim 1, wherein the peg is composed of a peg material, and backfilling the removed portion of the peg comprises depositing a material that is different from the peg material.

10. The method of claim 1, wherein removing the portion of the peg and backfilling the removed portion of the peg forms a tapered seam.

11. The method of claim 1, wherein removing the portion of the peg and backfilling the removed portion of the peg produces an interface with the sunken disk having better thermal contact and structural robustness than prior to the removing and backfilling.

12. A recording head for use in heat-assisted magnetic recording, comprising:

a write pole extending to a media-facing surface of the recording head;

a near field transducer located adjacent to the write pole, the near field transducer configured to generate plasmonic activity from light delivered by a waveguide and to focus and direct the plasmonic activity toward a recording surface of magnetic recording media placed adjacent to the media-facing surface, the near field transducer including a plasmonic disk and a peg extending from the plasmonic disk toward the media-facing surface, the plasmonic disk and peg being disposed on a sunken disk such that the peg has a first portion that extends beyond the sunken disk and a second portion that forms an interface with the sunken disk, wherein the first portion of the peg is highly crystalline and the second portion of the peg is polycrystalline, and wherein the interface is substantially free of voids.

13. The recording head of claim 12, wherein the first portion of the peg is composed of a first material and the second portion of the peg is composed of the first material.

14. The recording head of claim 13, wherein the first portion of the peg abuts the second portion of the peg at a planar seam.

15. The recording head of claim 12, wherein the first portion of the peg is composed of a first material and the second portion of the peg is composed of a second material different from the first material.

16. The recording head of claim 15, wherein the first portion of the peg abuts the second portion of the peg at a tapered seam.

* * * * *